United States Patent [19]

Rizk et al.

[11] Patent Number: 4,842,938
[45] Date of Patent: Jun. 27, 1989

[54] METAL REINFORCING PATCH AND METHOD FOR REINFORCING METAL

[75] Inventors: Sidky D. Rizk, Westfield; Navinchandra B. Shah; John W. Powers, both of Oldbridge, all of N.J.

[73] Assignee: Essex Specialty Products, Inc., Clifton, N.J.

[21] Appl. No.: 172,149

[22] Filed: Mar. 23, 1988

Related U.S. Application Data

[60] Division of Ser. No. 926,528, Nov. 4, 1986, Pat. No. 4,766,183, which is a continuation-in-part of Ser. No. 822,777, Jan. 27, 1986, abandoned.

[51] Int. Cl.⁴ ............................................. B32B 15/08
[52] U.S. Cl. .................................... 428/416; 156/249; 156/307.3; 156/329; 428/261; 428/355; 523/457; 525/454; 525/903
[58] Field of Search ...................... 156/249, 329, 307.3; 428/261, 416, 355; 525/903, 454; 523/457

[56] References Cited

U.S. PATENT DOCUMENTS 4,374,890  2/1983  Shimizu et al. ...................... 428/355
4,623,702  11/1986  Grieves et al. ...................... 525/454

Primary Examiner—John J. Gallagher
Attorney, Agent, or Firm—Curtis, Morris & Safford, P.C.

[57] ABSTRACT

A method for making a one package heat curable (i.e. thermosetting) composition which, on heating, forms a urethane/epoxy/silicone interpenetrating polymer network (IPN) system; one package heat curable compositions made by such a method; metal reinforcing patches, directly adherent to an oily metal surface such as an oily steel surface, comprising a sheet-like carrier having thereon such a one package heat curable composition in combination with a filler admixed therewith, said filler possibly including magnetic particles; a method for reinforcing metal which comprises applying thereto such a metal reinforcing patch and curing said heat curable composition at an elevated temperature to form a urethane/epoxy/silicone interpenetrating polymer network.

8 Claims, No Drawings

METAL REINFORCING PATCH AND METHOD FOR REINFORCING METAL

This application is a division of application Ser. No. 926,528 filed Nov. 4, 1986, now U.S. Pat. No. 4,766,183 issued Aug. 23, 1988, which in turn is a continuation-in-part of application Ser. No. 822,777 filed Jan. 27, 1986, now abandoned.

The present invention relates to methods for making a one package heat curable composition adaptable to use as an adhesive; to compositions made by such methods; to metal reinforcing patches comprising such a composition in combination with a filler and present on a sheet-like carrier; and to methods for reinforcing metal by applying such a metal reinforcing patch to the surface of the metal and then curing said composition at an elevated temperature.

It is an object of the present invention to develop a one package heat curable composition, which composition is stable at room temperature but can be converted into an extremely hard, tough, and thermally stable product by heating to temperatures above about 250° F.

It is a further object of this invention to modify the rheological properties of such a composition by combination thereof with a filler and to apply such a modified composition as an adhesive to a sheet-like carrier, such as a woven glass fabric, to provide a metal reinforcing patch.

It is a further object of the invention to reinforce metal by applying such a metal reinforcing patch to a metal surface and then curing the adhesive by heating.

It is a still further object of the invention to improve the adhesion of such a patch to a metal surface prior to curing by including magnetic particles as a filler in the heat curable composition.

It is a feature of the invention that the adhesive on such a metal reinforcing patch has sufficient cohesive strength and surface lubricity so that it can be protected with a silicone release paper, but that the adhesive has sufficient tack so that it will remain adhered indefinitely to a metal surface, particularly an oily metal surface, until such time that the adhesive present on the metal reinforcing patch is cured and bonded to the metal surface by the application of heat.

Metal reinforcing patches of this kind can suitably be used in the automotive industry for reinforcing certain critical areas of automotive bodies such as roof bows, quarter panels, door, hoods, and trunk lids, obviating the need for expensive welded metal braces. However, the use of such reinforcing patches is not limited to the automotive industry and they can be used for the reinforcement of any fabricated sheet metal parts, for example in refrigerators, washers, control panels, cabinets, and the like.

The objects of the present invention have been accomplished by a method for making a one package heat curable composition which on curing at an elevated temperature will form a urethane/epoxy/silicone interpenetrating polymer network (IPN) system, which composition is made by (1) reacting an excess of a polyisocyanate with a polyol to form a polyurethane prepolymer having a plurality of isocyanate groups thereon, (2) thermo-reversibly blocking some of said isocyanate groups with a blocking agent, (3) reacting the remaining isocyanate groups with a silicone polycarbinol, alone or in combination with a polyol, and (4) mixing the resulting reaction product with a polyepoxide and a thermo-reversibly blocked polyamine curing agent. The theological properties of such a one package heat curable composition can be modified by admixing one or more filters therewith to form adhesive compositions. Metal reinforcing patches according to the invention are prepared by applying an adhesive composition of this type to a sheetlike carrier, preferably a glass fabric. The adhesive on such a patch has the surprising property of releasing from a release paper applied thereto to protect the adhesive surface, but of sticking easily to metal surfaces, including oily metal surfaces. Such adhesives further resist humidity (i.e. are stable to curing in the presence of moisture) in an uncured state so that they are stable at room temperature under ambient conditions for at least six months. Nevertheless, on curing at elevated temperatures the adhesives are converted into extremely hard but tough products having good resistance to elevated temperatures and good impact resistance when cold.

The polyurethane prepolymer having a plurality of isocyanate groups which is employed in formulating the compositions according to the present invention is obtained by reacting a polyisocyanate, i.e. a compound having at least two isocyanate groups, with a compound having a plurality of hydroxy groups in amounts such that the ratio of equivalents of isocyanate groups to the equivalents of hydroxy groups is greater than 1, whereby a prepolymer having free isocyanate groups is formed. Preferably, the ratio of the equivalents of isocyanate groups to hydroxy groups is between about 2:1 and 4:1 and preferably is between 2:1 and 3:1. A typical polyurethane prepolymer formed between a diisocyanate and a diol at an isocyanate:hydroxy ratio of 2:1 is shown in the following formula:

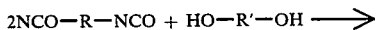

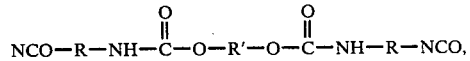

wherein R is an organic radical which may be of varied structure and R' is a polyester or polyether polymer chain. While the resulting polymer contains only terminal isocyanate groups, products having pendant isocyanate groups along the backbone will be formed if tri- or more highly substituted isocyanates and/or if triols or higher polyols are involved in the reaction.

These prepolymers containing isocyanate groups may be prepared from any polymerization or polycondensation product which contains hydroxyl groups and has a molecular weight from about 100 to about 10000, preferably from about 500 to about 5000. Examples of such products are the polyether and polyester polyols known in polyurethane chemistry. Polyether polyols may be prepared by forming alkylene oxide adducts of polyester polyols, including lactone polyols prepared by the polymerization of lactones, or by the reaction of alkylene oxides with materials such as castor oil. The polyester polyols include the lactone polyols discussed above, compounds such as castor oil, and polyester polyols formed by the reaction of an alkylene glycol with a dicarboxylic acid, for example. However, the preferred polyester polyols are lactone polyols prepared, for example, by the homopolymerization of lactones in reactions which effect opening of the lactone ring.

The organic polyisocyanates which are reacted in excess with such polyols for formation of isocyanate terminated polyurethane prepolymers of the present invention are those taught in the art. That is, they are aliphatic, cycloaliphatic, aralipahtic, or aromatic polyisocyanates such as those taught in Brode et al. U.S. Pat. No. 3,632,577, for instance. Particularly preferred isocyanates are polyphenylene polyisocyanates having an average functionality between 2 and 3.

As known in the art, the polyols and polyisocyanates are suitably reacted at a temperature between 0° C. and 110° C., preferably between 25° C. and 90° C. The reactions are carried out under an inert atmosphere such as a nitrogen blanket and under anhydrous conditions, suitably in the presence of a catalyst. The stannous salts of carboxylic acids, such as stannous octoate, stannous oleate, stannous acetate, and stannous laurate are known as catalysts for the formation of urethanes. Also, dialkyltin dicarboxylates such as dibutyl tin dilaurate and dibutyl tin diacetate are known in the art as urethane catalysts, as are tertiary amines and tin mercaptides. The amount of the catalyst employed is generally between 0.025 and 5 percent by weight of the reactants, depending on the nature of the isocyanate.

The polyols employed in this reaction, having two or more hydroxyl groups, are reacted with excess isocyanate until the isocyanate content in the prepolymer is close to the theoretical value for the NCO in excess, as is determined by titrating the free isocyanate groups in a sample of the prepolymer with dibutylamine.

It is known in the art that the reactivity of polyisocyanates can be controlled with so called blocking agents. The substances used as blocking agents according to the present invention are compounds having a single active hydrogen atom, which compounds react with and thermo-reversibly block an equivalent number of isocyanate groups. The blocked isocyanates are non-volatile and are chemically and physically stable at room temperature and at temperatures below about 100° C. for protracted periods in the presence of compounds containing active hydrogen atoms, e.g. curing agents. However, when such blocked isocyanates are heated to temperatures above about 215° F., preferably above about 250° F., isocyanate groups are regenerated. In the deblocked state at an elevated temperature, the deblocked isocyanate remains in equilibrium with the blocking agent, but reacts preferentially with active hydrogen atoms which may be present, for instance, those in a curing agent if such is present in the system. In this way, the equilibrium is shifted in favor of further deblocking and further curing reactions. Examples of such thermo-reversible blocking agents are oximes, caprolactam, phenols, etc.

Caprolactam is preferred in the present invention as a thermo-reversible blocking agent for the free isocyanate groups and contains an active hydrogen atom which reacts with the isocyanate groups at a temperature above the melting point of caprolactam (70° C.). Although the other blocking agents may be equally effective thermo-reversible blocking agents, they have other properties which render them less suitable for use in the present invention than caprolactam in view of the ultimate utility of the compositions of the invention as metal reinforcing patches. Thus, caprolactam is non-toxic and non-corrosive and, further, is a solid non-volatile compound which does not tend to form bubbles in adhesive compositions when these are cured at high temperatures.

The partially blocked isocyanate which is prepared according to the present invention is a polyisocyanate compound having an average of at least one blocked isocyanate group in the molecule and an average of less than one free isocyanate group per molecule. The partially blocked isocyanate can be readily prepared by reacting a prepolymer having at least two isocyanate groups per molecule with a thermo reversible blocking agent in an amount sufficient to give less than one free isocyanate group per molecule. When using caprolactam for blocking, after the addition of caprolactam to the isocyanato prepolymer the temperature is raised above the melting point of caprolactam, but below about 215° F., and mixing is continued with exclusion of moisture (e.g. under a blanket of dry $N_2$) until all the caprolactam has reacted.

The present invention further involves extending such a partially blocked isocyanate prepolymer during compounding by reacting the available free isocyanate groups therein with a stoichiometric amount of one or more compounds containing more than a single active hydrogen atom. This extension of the partially blocked prepolymer is essentially a process by which the molecular weight of the prepolymer and the viscosity and cohesive strength of the polymer mass are increased. The blocked and extended polymer contains no free isocyanate groups and, thus, is stable to atmospheric moisture which might otherwise promote premature curing reactions.

The compounds used for extension according to the invention are compounds having a silicon content. More in particular, silicone polycarbinols, i.e. polysiloxane polymers having silicon atoms in a silicone backbone and having active hydrogen atoms in hydroxy groups, are used to advantage. The silicone polycarbinols are fluids which combine typical silicone properties with alcohol reactivity and permit the introduction of a silicone backbone into the polymer system, which is reactive toward alcohols, to impart desirable silicone properties to the system.

Polymers modified in this matter with silicone polycarbinols exhibit a wider variation in physical properties than would be expected if the polymer system had been modified by a simple addition of the silicone polycarbinols, without reaction. Some of the properties that can be introduced into the polymer system of the invention by modification with silicone polycarbinols are improved thermal stability, flexibility, resistance to humidity, internal lubricity, release from the release paper, and low temperature flexibility.

The polysiloxane carbinols or "silicone polycarbinols" are known.

Materials of this kind preferred for use in the present invention are commercially available from Dow corning under designations such as "DC 1248", "Q4-3667", "Q2-8026", and "Q4-3557", and have one of two structures, i.e. an ABA structure

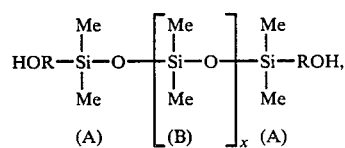

which is always difunctional, or a graft copolymer structure

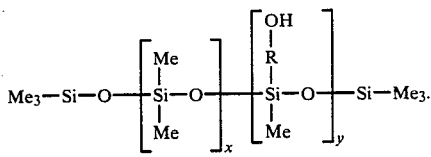

In these compounds R is an organic spacer group and the alcoholic hydroxy groups are attached to the silicone polymer by a non-hydrolyzable Si—C bond. Thus, the hydroxyl groups in these compounds may be primary or secondary. The compounds, which have a functionality of two or more, have a molecular weight ranging from 400 to 6000.

During extension, the silicone carbinol can be used alone or in combination with a polyol of the type described earlier herein having active hydrogen atoms. However, the total amount of hydroxy groups should not be in excess of the available free isocyanate groups. It is possible to react a silicone polycarbinol, alone or together with a polyol, during the preparation of the prepolymers and then later to extend with only further polyol or with a mixture of polyol and a silicone polycarbinol in an amount not exceeding the amount of available free isocyanate groups. If a mixture of silicone polycarbinol and polyol is employed, the ratio of equivalents of OH provided by each component can suitably vary from 9:1 to 1:9. In general, the silicone carbinol is employed alone or in large amounts relative to the polyol if those qualities imparted to the polymer by its silicon content are prized, e.g. good release properties or heat resistance. On the other hand, the presence of polyol imparts flexibility and the amount of polyol employed is chosen to increase this property in the final polymer.

In order to obtain cured products of increased hardness as well as to accelerate the rate of cure, it is preferred to include an epoxy resin containing an average of more than one oxirane group per molecule in combination with the blocked polyisocyanate discussed above to formulate the compositions of the invention. As little as 5 percent and as much as 200 percent by weight of epoxy resin, by weight of the blocked isocyanate, can be used without destroying the elastomeric properties of the cured product.

A variety of epoxy resins can be used to provide these effects without appreciably affecting the stability of the product. Among the epoxy resins which can be thus used are polyepoxides having an average of more than one oxirane (1,2-epoxy) group per average molecule, including polyglycidyl ethers of polyphenols such as 2,2-bis-(4-hydroxyphenyl)propane ("bisphenol A"), 4,4'-dihydroxy-diphenylmethane, 4,4'-dihydroxy-benzophenone, 1,1-bis-(4-hydroxyphenyl)ethane, 2,2-bis-(4-hydroxy-t-butyl-phenyl)propane, bis-(2-hydroxynaphthyl)methane, 1,5-dihydroxy-naphthalene, and phenolic novolac resins. Such polyepoxides can be made by reacting epichlorohydrin with an appropriate precursor phenolic compound in the presence of an alkali.

Finally, as a curing agent for the curable components of the compositions of the present invention, the invention employs a blocked polyamine. Although polyamines per se are compounds having active amino hydrogen atoms which can be used as crosslinking or curing agents both for compounds containing isocyanate groups and those containing epoxy groups, and although a polyamine crosslinking agent would react very rapidly with isocyanate groups after the latter were deblocked by heat, nevertheless such a polyamine could not be introduced into the compositions of the present invention. These one package compositions, in addition to containing blocked isocyanate groups, also contain reactive epoxy groups and the presence of the polyamine and the epoxy resins in such a system would render the system unstable. Accordingly, according to the present invention the active hydrogen atoms of an amine curing agent are also blocked prior to incorporation into the composition of the invention.

More in particular, the amine curing agents of the invention are polyamines obtained by the reaction of approximately equimolar amounts of an anhydride such as phthalic anhydride, hexahydrophthalic anhydride, tetrahydrophthalic anhydride, methyltetrahydrophthalic anhydride, polyazelaic anhydride, succinic anhydride, or dodecyl succinic anhydride with a polyamine such as ethylene diamine, diethylene triamine, triethylene tetramine, 1,3-diamino propane, 1,6-diamino hexane, imino bis(propylamine), or methyl imino bis(propyl amine) at a temperature from about 50° C. to about 160° C. in a non-aqueous medium, all as described in Moran et al. U.S. Pat. No. 3,639,657.

A blocked polyamine curing agent preferred for use in the present invention is the reaction product of phthalic anhydride and diethylene triamine, commercially available from Ciba-Geigy under the tradename "Araldite HT939". Incorporation of such blocked amine in a composition containing blocked isocyanate and epoxy resin provides a one package shelf stable composition which can be cured into an extremely hard product by the application of heat above the deblocking temperature of the isocyanate and amine groups, i.e. above about 250° F.

The amount of amine condensation product present in the composition must be enough to provide amino hydrogen atoms (whether primary and secondary) in an amount which is at least 0.5–1.5 times the total number of equivalents of isocyanate and epoxy groups present in the composition. However, the preferred amount of the blocked amine is between 0.8–1.2 times the total equivalents of isocyanate and epoxy groups present in the composition. On curing, the final interpenetrating polymer network consists of crosslinked urethane/epoxy/silicone.

To formulate an adhesive composition according to the present invention, the curable compositions comprising partially blocked prepolymer, reacted with a silicone polycarbinol and a polyol having active hydrogen atoms as extending agents, epoxy resin, and blocked amine curing agent are combined with one or more filters, rheology control agents, and additives known in the art. By the addition of such materials, physical properties of the composition such as viscosity, flow rate, sag, and the like can be modified. However, to prevent premature deblocking of the amine curing agent or the reaction of deblocked isocyanate groups with moisture, the fillers used should not contain an excessive amount of moisture. Exemplary fillers and additives include carbon black, titanium dioxide, clays, talc, mica, glass bubbles, calcium carbonate, fumed silica, surface modified clays, antioxidants, silanes, defoaming agents, and the like.

To make a metal reinforcing patch according to the present invention, an adhesive of the type described above is suitably applied in a coating 10 to 200 mils thick on a carrier, preferably a flexible carrier, and most suitably a glass fabric. The adhesive composition, which gives excellent release from a release paper, can be protected with such a release paper until use. Nevertheless, the adhesive compositions have excellent adhesion to metal surfaces, particularly oily metal surfaces, and can be adhered to surfaces after removal of the release paper from the metal reinforcing patch and application of the patch to the metal surface under contact pressure.

To improve adhesion of the patch to a metal surface prior to cure, a magnetic (i.e. magnetized or magnetizable) substance may be incorporated into the adhesive composition, most conveniently in finely divided form, replacing or supplementing the conventional fillers exemplified above. The magnetic substance may be metallic, such as iron or a ferromagnetic alloy, for example of iron, cobalt, or nickle, or may be a magnetic oxide such as iron oxide or chromium dioxide, but preferably is a ceramic ferrite such as a barium or strontium ferrite. The composition of such a ferrite, many of which are known in the art, is immaterial for the purposes of the invention if its magnetic properties are adequate.

The size of the particles employed is similarly not critical providing they are neither so large nor so small as to create problems with incorporating them into the composition. If the particles are too large, they may not be homogeneously distributed in the composition. Particles that are too small may also provide problematic: finely divided metals may be pyrophoric, for instance. Particles passing a 325 mesh sieve (44 microns or less) are conveniently used. In general, particles 100 microns in size or less are suitable.

If magnetic particles are added, they are incorporated into the composition just as are other fillers, which they may replace in whole or in part. After a patch has been prepared from such a composition in the manner described above, the patch is suitably exposed to a magnetizing field to impart permanent magnetic properties to it.

During curing of the compositions of this invention by the application of heat, complex competing reactions take place. In their simplest form, these reactions can be identified as involving:

1. the deblocking of blocked isocyanate groups to generate free isocyanate groups;
2. the deblocking of the blocked polyamine curing agent to generate free amino groups;
3. the reaction of the deblocked amine with the deblocked isocyanate in the prepolymer to generate polyurea linkages;
4. the reaction of the deblocked amine with the epoxy resin;
5. the possible partial reaction of epoxy resin with deblocked isocyanate to generate oxiazolidone linkages; and
6. the possible partial reaction of the epoxy resin with urethane urea linkages present in the polyurea/polyurethane.

The reactions of deblocked amine with isocyanate and epoxy groups take place at a very rapid rate and are the predominant reactions. The reaction of epoxy groups with isocyanate groups, although known to occur, is sluggish and may be insignificant. The reaction of epoxy groups with urea linkages is partial at elevated temperatures. The final cured product has a crosslinked polyurethane-urea/silicone/epoxy interpenetrating polymer network structure. The polymeric system has the adhesive properties of both urethane and epoxy resins, has the solvent resistance of epoxy resins, and has the elastomeric character of urethane resins and the heat resistance of silicone resins.

A better understanding of the present invention and of its many advantages will be achieved by referring to the following specific examples, given by way of illustration.

The test results reported in these Examples are obtained in the following ways.

For testing, 1 50 mil thick coating of the compound to be tested is supported on a woven glass fabric and covered with a silicone coated release paper. A 1 inch × 6 inch strip of the coated glass fabric (patch) is cut, the release paper is removed, and the patch is brought in contact with an oily steel strip of the same size. The oily steel strips are prepared by applying an industrial machine drawing oil, commercially available as "WEL-O-5 Oil" from Chevron, used in metal stamping operations, as a thin film (0.22 ml/ft$^2$) to sheet steel about 20 mils thick.

Release: The ability of the compound to release from a silicone release paper without sticking to it is tested. If there is no release, or part of the adhesive comes off the patch with the release paper, release is characterized as "poor".

Cure: A 1 inch × 6 inch patch/steel assembly is cured for 30 minutes at 300°–350° F. The adhesion of the patch is then checked by bending the assembly in the middle to rupture the patch under tension, simulating denting of the metal.

Moisture Resistance: A 1 inch × 6 inch patch/steel assembly is first exposed to 100 percent relative humidity at 100° F. for 24 hours or more and is then cured. Cure and adhesion are checked as before to determine if there is porosity of the adhesive caused by foaming as a result of water absorption and precuring.

Flexural Strength: This is a measure of the stiffening of the metal caused by the application thereto of the cured reinforcing patch. A 1 inch × 6 inch patch/steel assembly is supported on two supports 4 inches apart and then loaded from the center until tensile rupture occurs in the reinforcing patch.

EXAMPLE 1

(A) Synthesis of Partially Blocked Polyurethane Prepolymer Reacted with Silicone Polycarbinol 462 g (3.4 equivalents) of a mixture of polymeric methylene diphenyl di- and tri-isocyanates, commercially available under the tradename "PAPI 901" and having an average functionality of 2.2–2.3 were reacted in a 4-necked reaction flask equipped with a stirrer thermometer, dry nitrogen inlet, and heating mantle, with 625 g. (1.0 equivalent) of polycaprolatone diol and 300 g. (0.15 equivalent) of a silicone polycarbinol commercially available as "Dow Corning 1248 fluid". The polymer is a graft polymer having secondary alcohol functionality, an average of 3 hydroxy groups per molecule and an average hydroxyl equivalent weight of 2000. The reagents were mixed under a dry nitrogen blanket at 75° C. for two hours. At this point, the isocyanate content of the product was found to be 6.9 percent. Then, 113 g (1.0 equivalent) of epsilon-caprolactam blocking agent were added and mixing was continued for one hour at 75° C.

The resulting prepolymer contained 3.4 percent of free isocyanate groups and 2.8 percent of blocked isocyanate groups.

(B) Synthesis of a One Component Sheet Crosslinkable Composition Comprising the Partially Blocked Polyurethane Prepolymer of Example 1(A)

65 g (0.26 equivalent) of a polycaprolactone diol (MW=530) were added to 326 g of (0.47 equivalent) of the prepolymer of Example 1(A) containing silicone in the polymer structure and were mixed under a stream of dry nitrogen at room temperature until all of the isocyanate in the prepolymer of Example 1(A) was fully reacted with the diol.

Then, 162 g (1.7 equivalents) of diethylenetriamine blocked with phthalic anhydride ("Araldite HT939"), 447 g (2.33 equivalents) of the diglycidyl ether of Bisphenol A ("Araldite 6010"), and 0.025 of dibutyltin dilaurate tin catalyst were mixed in for 15 minutes under vacuum to remove any entrapped air.

The resulting composition was cast as a film 75 mil thick on release paper and baked for 30 minutes at 300°–325° F. The polymer cured to a hard thermoset sheet having a Durometer hardness of 70°–80° D.

EXAMPLE 2

(A) Synthesis of Partially Blocked Urethane Prepolymer 476 g (3.5 equivalents) of the same polyisocyanate employed in Example 1 were reacted with 625 g (1.0 equivalent) of polycaprolactone diol in a 4-necked reaction flask equipped with a stirrer, thermometer, dry nitrogen inlet, and a heating mantle. The two reagents were mixed under a dry nitrogen blanket at 7° C. for two hours. At this point, the isocyanate content was 9.5 percent. Then, 113 g (1 equivalent) of epsilon-caprolactam were added as a blocking agent and mixing was continued for one hour at 75° C.

The resulting prepolymer contained 5 percent of free isocyanate groups and 3.3 percent of blocked isocyanate groups.

(B) Synthesis of a One Component Heat Curable Composition Containing the Partially Blocked Urethane Prepolymer of Example 2(A)

350 g (0.19 equivalent) of a polycaprolactone triol (MW=540) and 134 g (0.07 equivalent) of a polycarbinol triol (MW=6000) were added and mixed with 245.0 g (0.47 equivalent) of the prepolymer of Example 2(A) under a stream of nitrogen and at room temperature until no isocyanate groups were detected in the mixture.

Then, 160.0 g (1.75 equivalents) of blocked polyamine ("Araldite HT939"), 426.0 g (2.22 equivalents) of diepoxide ("Araldite 6010"), and 0.025 g of tin catalyst were then mixed into the first mixture under vacuum for 15 minutes.

The resulting composition was applied as a layer 75 mil thick on release paper and baked for 30 minutes at 300°–325° F. The polymer cured into a hard thermoset sheet having a Durometer hardness of 70°–80° D.

EXAMPLE 3

Preparation of a Gelling Agent Masterbatch

For the formulation of adhesives, it is convenient to incorporate the epoxy resin, or parts thereof, into the compositions of the invention together with a filler by combination of epoxy and filler into a gelling agent masterbatch.

More in particular, 20 g of surface modified clay, commercially available as "bentone 27" from the National Lead Co., were dispersed in 80 g of an epoxy resin commercially available as "Araldite 6010" of Ciba-Geigy. The dispersion was given two or three passes on a 3-roll mill to formulate the gelling agent masterbatch.

EXAMPLE 4

(A) Formulation of Adhesive

An adhesive composition according to the present invention was prepared by combining the prepolymer of Example 1(A) and the gelling agent masterbatch of Example 3 with additional diol extending agent, further epoxy resin, additional fillers, and a blocked polyamine curing agent in the proportions given below. More in particular, mixing is done in two stages in a jacketed planetary mixer under vacuum. In a first stage, the prepolymer is extended by reaction at 50°–55° C. for 45 minutes with the polycaprolactone diol in the presence of the tin catalyst. The NCO content of the product is less than 0.2 percent. In a second stage, the blocked polyamine/epoxy, gelling agent, and fillers are added and mixed for 30–40 minutes until homogeneous and free of air. The mixture is then packed in polyethylene tubes and sealed in pouches.

| | | |
|---|---|---|
| Prepolymer of Example 1(A) (contains 0.022 free NCO and 0.018 blocked NCO) | 27.5 g | (0.040 eq.) |
| Polycaprolactone diol (mol. wt. 530) | 5.5 g | (0.022 eq.) |
| Phthalic anhydride blocked diethylene triamine | 13.7 g | (0.15 eq.) |
| Diglycidyl ether of Bisphenol A | 19.7 g | |
| Gelling agent masterbatch of Example 3 | 21.0 g | (0.19 eq. of epoxy) |
| Talc filler | 12.5 g | |
| Carbon black filler | 0.1 g | |
| Tin catalyst | 0.0025 g | |
| | 100.0025 | |

(B) Evaluation of the Adhesive of (A)

| | |
|---|---|
| 1. Release | Excellent |
| 2. Cure 30 min. @ 177° C. | Very good |
| 3. Adhesion | 100% cohesive failure |
| 4. Stability at 55° F. for 3 days | Very good |
| 5. Mated steel sample left in humidity box at 100° F. and 100% RH for 48 hrs. before curing for 30 min. @ 177° C. | No foaming and porosity |
| 6. Heat stability: Flexural strength at failure | |

| | Load in lbs./deflection in inches |
|---|---|
| Control | 40/0.275 |
| Hours of exposure at 204° C. | |
| 1 hr. | 40/0.275 |
| 3 hrs. | 32/0.15 |
| 4 hrs. | 26/0.15 |
| 6 hrs. | 32/0.105 |

EXAMPLE 5

(A) Formulation of Adhesive

An adhesive composition was prepared from the prepolymer of Example 2(A) by reaction with silicone polycarbinol and polyol extending agents, admixture with an epoxy resin and fillers (partially in the form of a masterbatch), and combination with a blocked polyamine curing agent as follows. As in Example 4, extension is effected in a first stage by catalyzed reaction at 50°-55° C. of the prepolymer, polycaprolactone triol, and polycarbinol triol, followed by a second stage blending of this reaction product with epoxy, fillers, and amine curing agent.

| | | |
|---|---|---|
| Prepolymer of Example 2(A) (contains 0.025 free NCO and 0.016 blocked NCO) | 21.0 g | (0.041 eq.) |
| Polycaprolactone triol (mol. wt. 540) | 3.0 g | (0.016 eq.) |
| "1248 fluid" polycarbinol triol (mol. wt. 6000) | 11.5 g | (0.006 eq.) |
| "Araldite HT939" blocked amine | 13.7 g | (0.15 eq.) |
| "Araldite 6010" diepoxide | 19.7 g | } 0.91 eq. epoxy |
| Gelling agent masterbatch of Example 3 | 21.0 g | |
| Talc filler | 10.0 g | |
| Tin catalyst | 0.0025 g | |
| Carbon black | 0.1 g | |
| | 100.00 | |

(B) Evaluation of Adhesive

| | |
|---|---|
| 1. Release | Excellent |
| 2. Cure 30 min. @ 177° F. | Very good |
| 3. Adhesion | 100% cohesive failure |
| 4. Mated steel sample left in humidity box at 100% RH and 38° C. for 48 hrs. before curing for 30 min. @ 177° C. | No foaming and porosity |

COMPARISON EXAMPLE

(A) Formulation of Comparative Adhesive Composition

For purposes of comparison, the prepolymer of Example 2(A) was formulated into an adhesive composition comparable to that of Example 2(B) by catalyzed reaction with a polyol extending agent in a first stage at 50°-55° C. and combination of the reaction product with an epoxy resin, fillers, and a blocked polyamine curing agent in a second stage. However, the adhesive formulated in this manner failed to contain any silicone resin, introduced into the adhesive of Example 2(B) in polymer extension reactions. More in particular, the adhesive formulated for comparison purposes had the following composition:

| | | |
|---|---|---|
| Prepolymer of Example 2(A) (contains 0.027 eq. free NCO and 0.018 eq. blocked NCO) | 22.8 g | (0.045 eq.) |
| Polycaprolactone diol (mol. wt. 530) | 7.2 g | (0.027 eq.) |
| "Araldite HT939" blocked amine | 14.9 g | (0.016 eq.) |
| "Araldite 6010" diglycidyl ether of Bisphenol A | 21.4 g | (0.012 eq. epoxy) |
| Gelling agent masterbach of Example 3 | 22.8 g | |
| Talc filler | 10.8 g | |
| Carbon black pigment | 0.1 g | |
| Tin catalyst | 0.0025 g | |
| | 100.0025 | |

(B) Evaluation of Comparative Adhesive

Approximately 75 mil thick coating of this compound was supported on a glass fabric and covered with a silicone coated release paper. A 1 inch×6 inch strip of the patch was cut and the release paper was removed slowly. The release paper could not be pulled off easily without pulling the coating apart. After the release paper was removed, the patch was brought in contact with a steel strip of the same size which was oiled with a tin coating of lubricating oil. One sample of such composite was left in a humidity box at 100° F. and 100 percent relative humidity for 48 hours. This sample along with a freshly prepared unexposed sample were cured for 30 minutes at 177° C. Cure and adhesion were evaluated by bending the composite strip from the middle until the patch broke. The adhesion was excellent as was evident by a thin film of polymer left on the steel surface after the cured patch was broken off from the surface. Also as a measure of stiffening effect, it tool only 10 lb. force to bend the metal strip, whereas 32 lbs. of force was required to bend a metal strip reinforced with a patch. The sample which was exposed to humidity foamed very badly when cured. The effect of heat on stiffness is also listed below. To check the stability, the compound was left in an oven at 55° C. for 3 days.

| | |
|---|---|
| 1. Release | Poor |
| 2. Cure 30 min. @ 177° C. | Very good |
| 3. Adhesion | 100% cohesive failure |
| 4. Stability at 55° C. for 3 days | Very good |
| 5. Mated steel sample left in humidity box at 100° F. and 100 percent RH for 48 hrs. before curing for 30 min. @ 177° C. | Foaming at the interface and porosity |
| 6. Heat stability: Flexural strength at failure | |

| | Load in lbs./ deflection in inches |
|---|---|
| Oily steel (33 mil thick) Control | 10/0.76 |
| | 31/0.175 |
| Hours of exposure at 204° C. | |
| 1 hr. | 31/0.175 |
| 3 hrs. | 23.5/0.155 |
| 4 hrs. | 24/0.15 |
| 6 hrs. | 25/0.125 |

EXAMPLE 6

A magnetic patch was prepared by replacing the talc and carbon black fillers in the composition of Example 5(A) with 100 g of a commercially available powdered barium ferrite (325 mesh).

A coating of this composition about 50 mil thick was applied to glass fabric and covered with silicone release paper. The patch was exposed to a magnetic field of bout 10,000 Oersteds. The patch was permanently magnetized with a magnetic field intensity of 60 Gauss.

A 3 inch square piece of the patch remained adhered to an oily steel surface held in an inverted position over a period of weeks. Also, the patch was cured at 300° F. for 30 minutes in an inverted position. Although the adhesive composition becomes more fluid during the initial stages of curing, the patch remained adhered and did not alter its position.

What is claimed is:

1. A metal reinforcing patch comprising a flexible carrier having thereon
an adhesive comprising
  a one package heat crosslinkable composition made by combining a polyepoxide compound and a thermo-reversibly blocked polyamine curing agent with an extended polyurethane prepolymer, free of isocyanate groups, prepared by thermo-reversibly blocking some of the isocyanate groups of a polyurethane prepolymer having a plurality of isocyanate groups and reacting the non-blocked isocyanate groups with a silicone polycarbinol and a polyol,
  in combination with at least one filler.

2. A patch as in claim 1 wherein said filler comprises a magnetic material.

3. A method for reinforcing a metal substrate which comprises applying thereto a reinforcing patch as in claim 1 and then curing said adhesive at a temperature above about 250° F.

4. A method as in claim 3 wherein said reinforcing patch is applied to an oily sheet metal surface.

5. A method for reinforcing a metal substrate which comprises applying thereto a reinforcing patch as in claim 2 and then curing said adhesive at a temperature above about 250° F.

6. A method as in claim 5 wherein said reinforcing patch is applied to an oily sheet metal surface.

7. A reinforced metal substrate made by the method of claim 3.

8. A reinforced metal substrate made by the method of claim 5.

* * * * *